Figure 1:
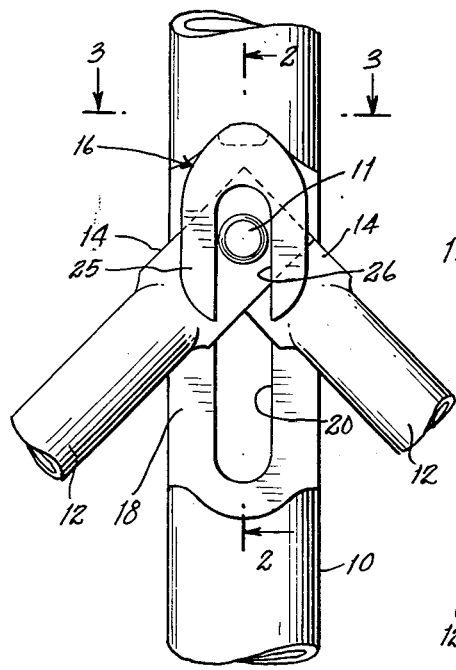

Sept. 18, 1962   M. P. FRENCH   3,054,630
SCAFFOLDING ATTACHMENT MEMBER
Filed May 13, 1960   2 Sheets-Sheet 1

INVENTOR.
MERLE P FRENCH
BY Krazinski + Nolan
ATTORNEYS

Sept. 18, 1962 M. P. FRENCH 3,054,630
SCAFFOLDING ATTACHMENT MEMBER
Filed May 13, 1960 2 Sheets-Sheet 2
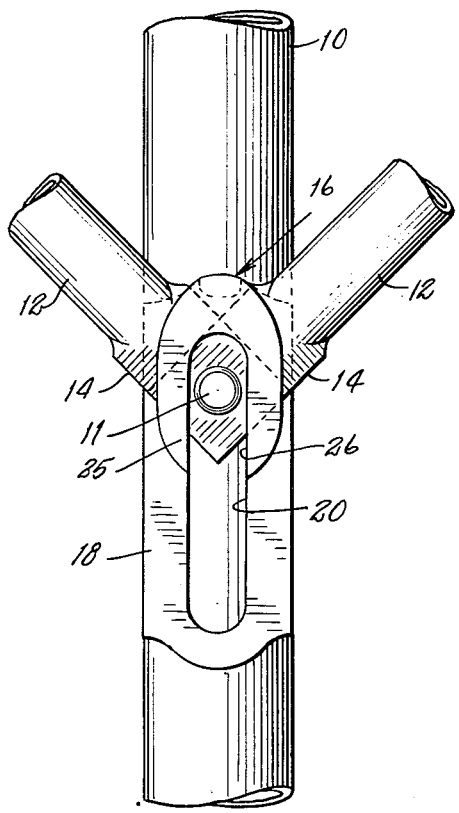
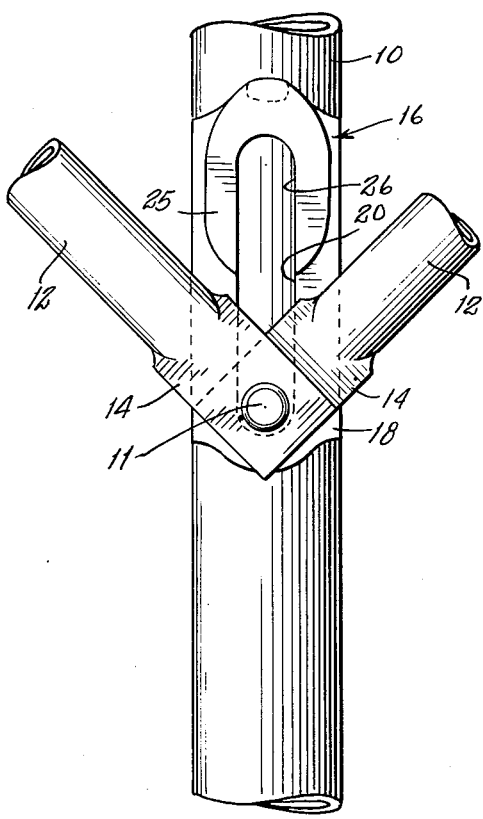
INVENTOR.
MERLE P. FRENCH
BY Krazinski + Nolan
ATTORNEYS

United States Patent Office 3,054,630
Patented Sept. 18, 1962

3,054,630
SCAFFOLDING ATTACHMENT MEMBER
Merle P. French, 90 Maywood Road,
New Rochelle, N.Y.
Filed May 13, 1960, Ser. No. 29,109
3 Claims. (Cl. 287—53.5)

The present invention relates to scaffolding structure of the type comprising vertical and horizontal frame members adapted to be assembled to provide the scaffolding structure and adapted to be taken apart to facilitate storage thereof, and is more particularly concerned with an improved member for attaching cross braces to the frame members which serve to rigidify the scaffolding structure.

A widely used form of scaffolding structure comprises frame members having threaded studs thereon, cross braces having apertured end portions through which the studs extend, an attachment member for each stud and a set of cross braces, and a nut threaded onto the stud for loosely securing the attachment member to the stud, whereby the attachment member is readily moved upwardly and drops to its lower position under the influence of gravity.

Heretofore, an attachment member has been utilized which member was constructed so that the nuts need not be completely unthreaded from the studs, thereby eliminating time consuming threading and unthreading operations and preventing loss of the nuts. Such members comprised a base having portions for engaging a frame member and an elongate aperture, a clamping strip or plate parallel and spaced from the base and formed with an elongate open ended slot, and a portion connecting the base and the plate at one end. The plate was shorter than the overall length of the aperture, so that the stud could be insered into the aperture at the end hereof remote to the open end of the slot and the nut could be applied to the stud. The stud was then inserted into the apertures of the cross braces and the attachment member was moved longitudinally with respect to the frame member in a direction to cause the stud to enter the slot, with the cross braces positioned between the plate and the nut. The nut thereupon was turned to move towards the plate, thereby clamping the cross braces against the plate.

In such a construction, the clearance between the nut and the base and the clearance between the plate and the ends of the cross braces were extremely small to enable the nut to secure and release the cross braces with a minimum of turning of the nut. While this was advantageous because of the time saved manipulating the nuts, it has been found that slight corrosion of the attachment members, the nuts, the cross braces and/or the frame member reduced the clearances to such an extent that it was difficult and almost impossible at times to move the attachment member relative to the stud to effect securement or release of the cross braces.

Accordingly, an object of the present invention is to provide an attachment member of the foregoing type which overcomes the difficulties and disadvantages thereof.

Another object is to provide such an attachment member which facilitates securement and release of the cross braces.

A further object is to accomplish the foregoing without any increase in cost of the attachment member.

Other and further objects will be obvious upon an understanding of the illustrative embodiment about to be described, or will be indicated in the appended claims, and various advantages not referred to herein will occur to one skilled in the art upon employment of the invention in practice.

Figure 2:
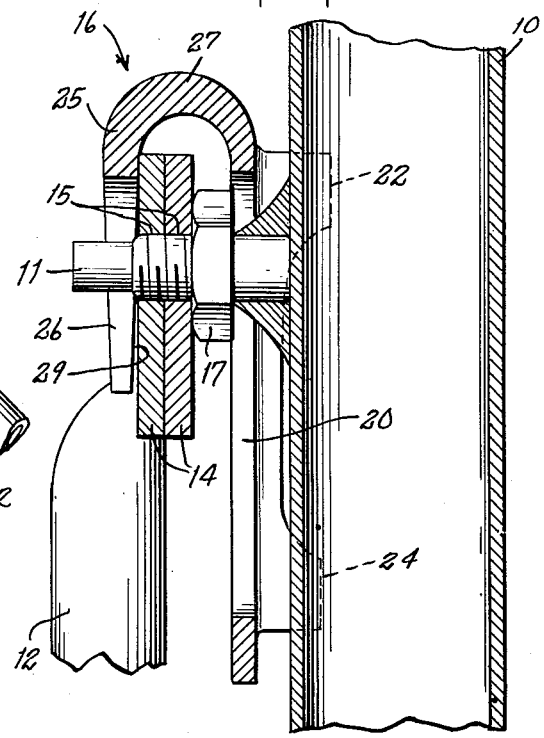
Figure 3:
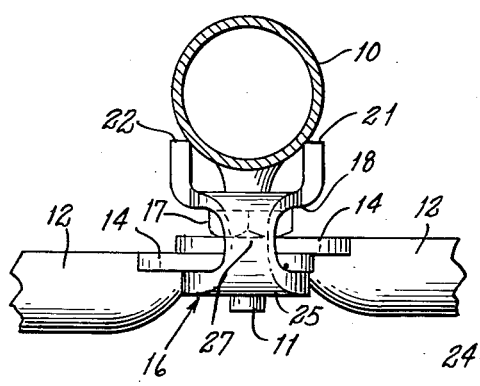
Figure 4:
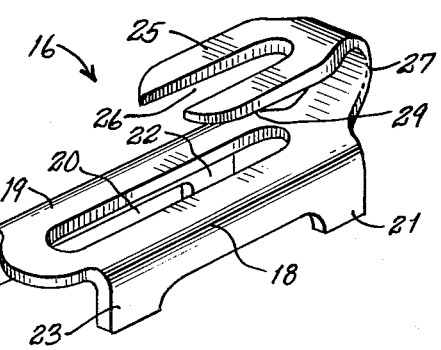

A preferred embodiment of the invention has been chosen for purposes of illustration and description and is shown in the accompanying drawings, forming a part of the specification, wherein: FIG. 1 is a fragmentary front elevational view of scaffolding showing a frame member to which a pair of downwardly extending cross braces are secured by an attachment member in accordance with the present invention; FIG. 2 is an enlarged sectional view taken along the line 2—2 on FIG. 1; FIG. 3 is a sectional view taken along the line 3—3 on FIG. 1; FIG. 4 is a perspective view of the attachment member; FIG. 5 is a view similar to FIG. 1 with the cross braces extending upwardly; and FIG. 6 is a view similar to FIG. 5 with the attaching member in the up-raised position.

Referring now to FIGS. 1 to 3 of the drawings in detail, there is shown a tubular, cylindrical scaffolding frame member 10 of the type commonly used for scaffolding adapted to be set up and taken apart, a threaded stud 11 permanently secured to the frame member and extending radially outwardly therefrom and perpendicular with respect to the longitudinal axis of the frame member 10, and a pair of cross braces 12, each having a flat lug 14 at the end thereof provided with an aperture 15 for receiving the stud 11. While two cross braces 12 are shown, it will be understood that at certain locations of the scaffolding structure more or less cross braces may be required.

As shown herein, the cross braces 12 are removably secured to the frame member by means of an attachment member 16 and a nut 17 threaded onto the stud 11 for loosely securing the attachment member 16 to the frame member 10.

The attachment member 16, shown in FIGS. 1 to 4, comprises a generally oblong base 18 having a substantially flat upper surface 19 formed with an elongated aperture 20 for receiving the stud 11, four legs 21, 22, 23 and 24 at the corners of the base for engaging or straddling the frame member 10, a clef or claw plate 25 substantially parallel to the surface 19 and spaced therefrom for retaining the lugs 14 of the cross braces and being formed with an elongate open ended slot 26 in alignment with the aperture 20 for the stud 11, and a U-shaped portion 27 connecting the end of the plate opposite the open end of the slot 26 to the base 18 at the end where the legs 21 and 22 are located.

In accordance with the present invention, the legs 21 and 22 are slightly longer than the legs 23 and 24 at the opposite end of the base to facilitate moving the surface 19 under the nut 17, and the plate 25 has a lower surface 29 which is inclined slightly upwardly and outwardly with respect to the upper surface 19 of the base (as viewed in FIG. 4) to facilitate positioning the plate over the lugs 14 of the cross braces, as will be described hereinafter.

A further feature of the present invention is that the connecting portion 27 is extremely narrow and has a width about equal to that of the aperture 20 and the slot 26, whereby smaller braces and lock arms of the scaffolding structure may be connected.

In assembling the structure shown in FIGS. 1 to 3, the stud 11, which is rigidly secured to the frame member 10, is inserted through the lower end of the aperture 20 (as viewed in FIG. 2) and the nut 17 is threaded onto the stud to thereafter loosely retain the attachment member 16 at all times. The cross braces 12 are attached by raising the member 16 and inserting the stud into the apertures 15 of the lugs 14 while the nut 17 is close to the surface 19. By reason of the fact that the lower legs 23 and 24 are shorter, the lower end of the base 18 is positioned closer to the frame member 10 to provide sufficient clearance between the nut 17 and the surface 29 to enable the lugs 14 to fit therebetween when the member 16 is moved downwardly to the position shown in FIG. 2, with the stud 11 now extending through the slot 26. The surface 29 of the clef plate 25 is then wedged very gradually onto the upper surface portion of the outer lug 14 because the longer legs 21 and 22 serve to move the surface 29 outward of the lug surface a very slight distance, whereby the final wedging action is not accomplished until the member 16 is in its lowermost position, as shown in FIG. 2.

In disconnecting the cross braces, the lower end of the member 16 (as viewed in FIG. 2) is tapped upwardly with a tool. By reason of the incline of the surface 29, slight upward movement of the member 16 immediately increases the clearance between the nut and the surface 29 to release the wedging action and facilitate further upward movement of the member 16 with practically no effort as the clearance increases rapidly. When the member 16 is in its upper position, the clef plate releases the lugs 14 and the cross braces can be removed while the member 16 remains on the stud.

A still further feature of the invention resides in the arrangement shown in FIGS. 5 and 6, where the cross braces 12 are shown extending upwardly. With the cross braces extending downwardly, as shown in FIGS. 1 and 2, there is no difficulty in installing and removing the cross braces 12 since the extremities of the lugs 14 are readily cleared by the claw plate 25 while the member 16 is in the up-raised position. However, with the braces extending upwardly the length of the claw plate 25 and the slot 20 had to be proportioned to provide sufficient clearance between the lower ends of the plate 25 and the lugs 14, as is seen in FIG. 6, to enable the cross braces to be installed and removed.

From the foregoing description, it will be seen that the present invention provides an improved attachment member which can be made at no increase in cost over such members presently in use or heretofore proposed and has the advantages of being readily secured and released.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. An attachment member for connecting one or more cross braces having an apertured end portion to a scaffolding frame member having a threaded stud thereon adapted to receive a nut for loosely retaining the attachment member to the frame member and adapted to extend through the apertures of the cross braces, which attachment member comprises a generally oblong base having a substantially flat upper surface formed with an elongate aperture for receiving the stud, legs at the corners of said base for straddling the frame member, a clef plate substantially parallel to said surface and spaced therefrom for retaining the cross braces and being formed with an elongate open ended slot in alignment with said elongate aperture for receiving the stud of the frame member, and a portion connecting the end of said plate opposite the open end of said slot to said base, said plate having a substantially flat lower surface inclined slightly upwardly and outwardly with respect to said upper surface of said base to facilitate positioning said plate over the ends of said cross braces.

2. An attachment member of the class described comprising a generally oblong base having a substantially flat upper surface formed with an elongate aperture, legs at the corners of said base, a clef plate substantially parallel to said surface and spaced therefrom and being formed with an elongate open ended slot in alignment with said elongate aperture, and a portion for connecting the end of said clef plate opposite the open end of said slot to said base, said plate having a substantially flat lower surface inclined slightly upwardly and outwardly with respect to said upper surface of said base.

3. An attachment member for connecting one or more cross braces having an apertured end portion to a scaffolding frame member having a threaded stud thereon adapted to receive a nut for loosely retaining the attachment member to the frame member and adapted to extend through the apertures of the cross braces, which attachment member comprises a generally oblong base having a substantially flat upper surface formed with an elongate aperture for receiving the stud, legs at the corners of said base for straddling the frame member, a clef plate substantially parallel to said surface and spaced therefrom for retaining the cross braces and being formed with an elongate open ended slot in alignment with said elongate aperture for receiving the stud of the frame member, a portion connecting the end of said plate opposite the open end of said slot to said base, said connecting portion having a width slightly exceeding the width of said slot and substantially less than the width of said clef plate, said plate having a substantially flat lower surface inclined slightly upwardly and outwardly with respect to said upper surface of said base to facilitate positioning said plate over the ends of said cross braces, and said legs at the end of said base connected to said plate being slightly longer than the legs at the opposite end of said base to facilitate moving said surface beneath the nut.

References Cited in the file of this patent

UNITED STATES PATENTS

| | | |
|---|---|---|
| 926,087 | Reuter | June 22, 1909 |
| 2,716,576 | Nordone | Aug. 30, 1955 |
| 2,726,902 | Borgman et al. | Dec. 13, 1955 |
| 2,808,298 | Meng | Oct. 1, 1957 |
| 2,932,368 | Schell | Apr. 12, 1960 |
| 2,935,346 | Marr | May 3, 1960 |

FOREIGN PATENTS

| | | |
|---|---|---|
| 171,124 | Germany | June 5, 1906 |